A. Mühl. Refrigerating Apparatus.

No. 121,402. Patented Nov. 28, 1871.

2 Sheets--Sheet 2.

UNITED STATES PATENT OFFICE

A. MÜHL, OF SAN ANTONIO, TEXAS.

IMPROVEMENT IN APPARATUS FOR THE MANUFACTURE OF ICE.

Specification forming part of Letters Patent No. 121,402, dated November 28, 1871.

*To all whom it may concern:*

Be it known that I, A. MÜHL, of San Antonio, in the county of Bexar and State of Texas, have invented a new and Improved Refrigerating Apparatus; and I do hereby declare that the following is a full, clear, and exact description thereof, which will enable others skilled in the art to make and use the same, reference being had to the accompanying drawing forming part of this specification, in which—

Figure 1:
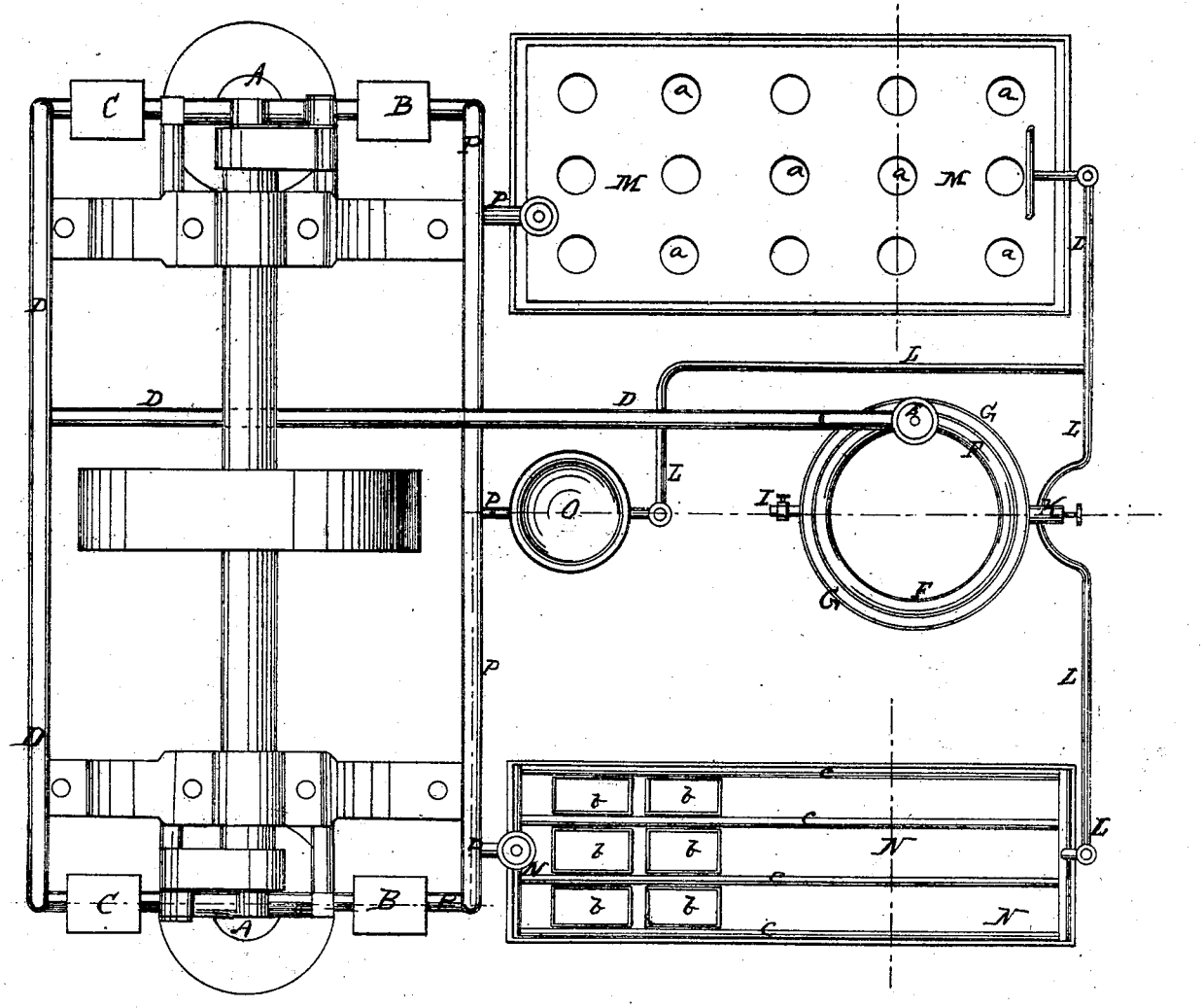
Figure 2:
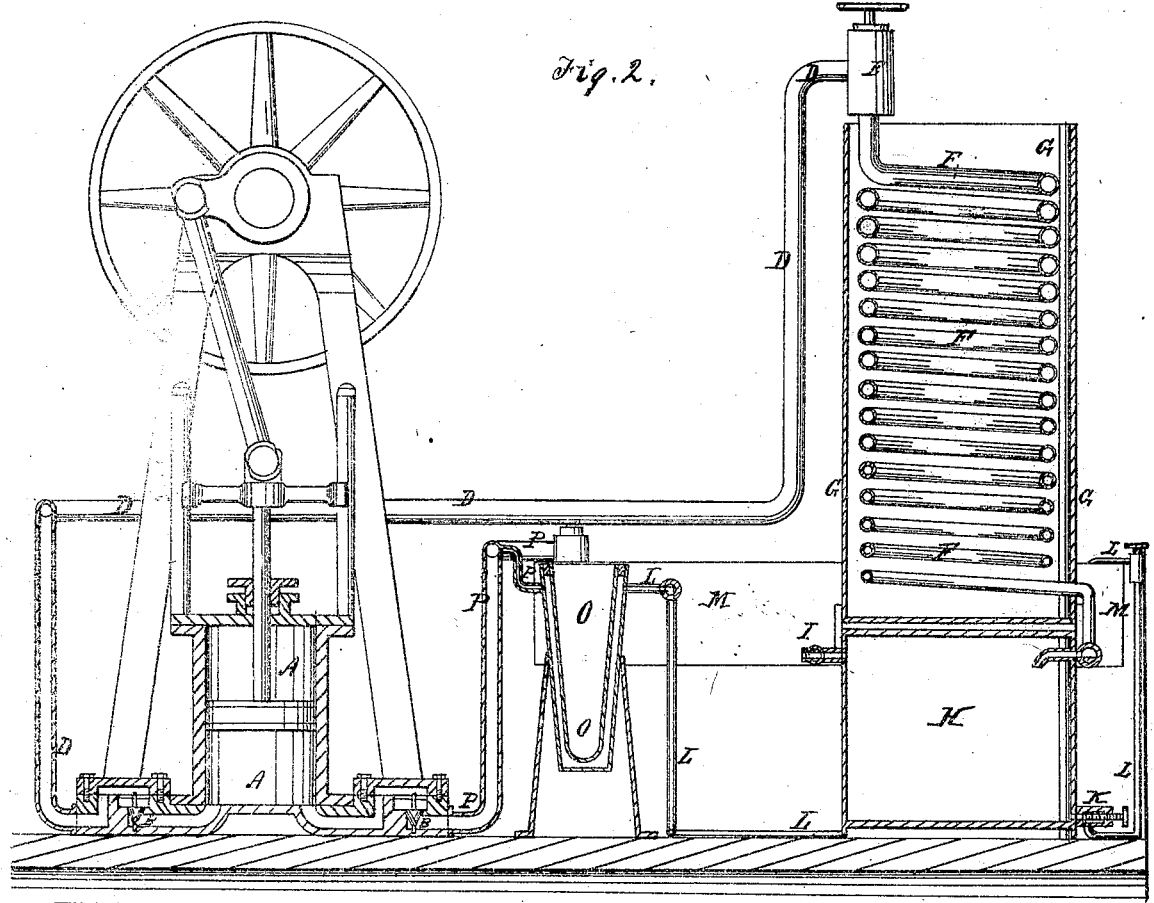
Figure 3:
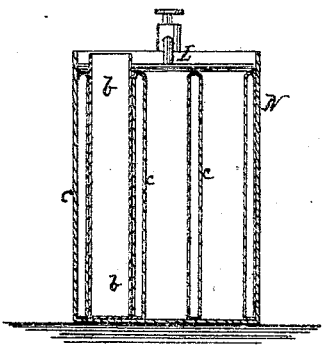
Figure 4:
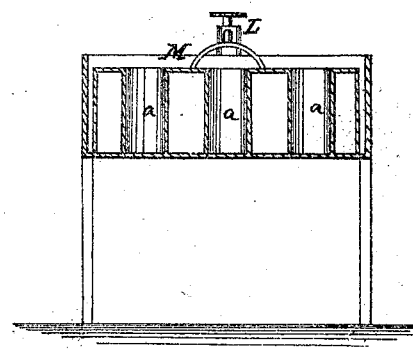

Figure 1 represents a top or plan view of my improved apparatus. Fig. 2 is a vertical section of the same. Figs. 3 and 4 are detail sectional elevations of the refrigerating vessels.

Similar letters of reference indicate corresponding parts.

My invention relates to apparatus for making ice and for cooling substances, and particularly to that class in which a continuous operation is maintained by means of a current of ether or other volatile fluid which liquefies at a low temperature, and which, in proportion as it is vaporized by heat absorbed from the substances in the freezing-vessel, is returned to a liquefactor, where it again becomes liquid and returns to the freezing-vessel, the liquefaction being effected by condensation or pressure. The freezing fluids I prefer to use are the ethereal vapors obtained from petroleum, which can only be condensed or liquefied at a temperature of two degrees below zero, or under a pressure of half an atmosphere. These vapors are highly volatile and are, therefore, well adapted for the purpose, being cheap, easily produced, and requiring but little power to condense. I can employ hydrochloric ether, methylic ether, chloride of methyl, or other fluids that can by comparatively low pressure be liquefied. I am aware, however, that these substances have been used for making ice, and also that it is not new in an ice-machine to liquefy the refrigerating vapor by condensation or pressure. My invention is directed principally to certain improvements in this class of machines, looking to the more ready and economical and sure reduction of the vapor to a liquid before it reaches the reservoir and the freezing vessel. It is customary to employ a worm intermediate between the pump and the freezing-vessel, which is, or should be, the principal agent in the reduction of the gas to a liquid form. It has been usual heretofore to make this worm of pipe of uniform diameter throughout. The objection to this is, that if the pipe be of small diameter it is not possible to force the vapor through fast enough and the machine is clogged and requires much expenditure of power to run it; and if the pipe be of large diameter—that is, of the usual diameter, say from one to two inches—it is so large that only the exterior shell of vapor in contact with or near the walls of the pipe will condense, while the remainder is still vapor and is discharged into the reservoir in this condition, and must be there condensed at an expenditure of considerable power, requiring an engine of more horse-power than would otherwise be needed; or it will enter the freezing-vessel while still in a vaporous state and thus defeat to a great extent the object for which it is used.

To obviate these objections, I make the worm of pipes of different diameters, as shown in the drawing, where F represents the worm; G, the water-tank surrounding it; H, the reservoir, into which the worm discharges; A, the pumps; D, the pipes leading from the pumps to the worm and provided with exhaust-valves C; L, the pipes leading from the reservoir to the freezing-vessels; P, the pipes leading to the pumps from the freezing-vessels, and provided with the usual suction-valves B.

The general operation of the apparatus may be described in a few words, after which I will return to the worm or liquefactor: Each pump as its piston rises draws into the cylinder from the freezing-vessels the ether which is vaporized by the heat of the substances in the freezing-vessels M N O, and as it descends forces the ether thus taken in out through the pipe D into the worm F; thence into the reservoir H, in which it should fall in a liquid state; thence out through the pipes L into the freezing-vessels, where it is revaporized and returned to the pump.

The worm F is composed of pipes of several sizes, the largest at the point where it receives the vapor from the pump. Two, three, or four or more folds of the coil are made of this largest-sized pipe, (say pipe of one and one-half inch diameter;) then I continue the coil for a number of folds with a pipe of one inch diameter; then continue the coil with a pipe of one-half inch diameter; and, finally, make the last portion of the worms of one-quarter inch pipe. By this means no resistance is offered to the vapors in the outset, the beginning of the worm being of pipe quite as large as the pipe D; then by gradually decreasing the diameter of the pipe the vapor is as gradually condensed without producing any undue resistance or pressure until, by the time it reaches the lower part of the worm, it becomes liquid and in this state falls into the tank or reservoir H.

All the inconveniences above mentioned heretofore experienced in this part of the machine are thus obviated, the worm is rendered much more effective in its operation, the power required to run a machine of given capacity is less, and the ether by the time it reaches the freezing-vessel is always in condition to act upon the substances therein contained to the best advantage.

It is manifest that the worm or liquefactor need not be constructed in the precise form shown in the drawing, the principle of my invention in this regard consisting in the use, in machines for making ice, of a liquefactor for the vapor composed of pipes or conduits of gradually-decreasing diameter, through which the ether is caused to pass, entering the largest first and thence passing through pipes of gradually-decreasing size.

The construction of the remainder of the apparatus it is not necessary to describe minutely, as it will be readily understood by those skilled in the art to which this invention pertains.

The tank G is, of course, to be kept filled with running water when the machine is in operation. In the reservoir H is a check-valve, I, which allows any air accumulated in the reservoir to escape. The pipe L is provided with a stop-cock, K, to arrest or regulate the flow of the liquid which passes from the reservoir through it into the various freezing-vessels. The pipe D is provided, near the point where it joins the worm, with a valve, E. The valves connected with the pump are, of course, poppet or self-acting valves.

In the drawing are represented three different kinds of vessels in which the refrigerating process can be carried on.

The vessel M is provided with receptacles $a$ $a$ or cavities to receive bottles or small vessels filled with water or other matter to be frozen. The liquid ether enters the vessel and envelops all the small vessels placed in it, imparting its temperature to the same. The vessel N is for receiving cans $b$ $b$, in which ice may be produced in blocks. These cans stand between hollow metallic partitions $c$ $c$, through which the ether passes from the pipe L at one end and escapes in the form of vapor through pipe P at the opposite end. The vessel O is of cylindrical or conical form. It has double walls, in which the liquid ether circulates. A vessel containing sirups or other compounds for ice-cream is placed into the vessel O and is rotated therein by hand or otherwise. The ether absorbing the heat of the substances to be cooled is evaporated and passes in a vaporous state through the pipe P back to the pump, said pipe leading to the suction-valves B.

What I claim, and desire to secure by Letters Patent, is—

1. In machinery for making ice or for refrigerating substances, organized and operating substantially as described, a worm or liquefactor, for condensing the vapor received from the pump, composed of pipes or conduits of gradually-decreasing diameter or section, substantially as and for the purpose set forth.

2. The said liquefactor or worm constructed as herein described, in combination with the reservoir, freezing-vessel or vessels, and pump or pumps, and their connections, substantially as shown and set forth.

A. MÜHL.

Witnesses:
C. H. GUENTHER,
TH. THIELEPAPE.

(83)